United States Patent
Freitag et al.

(10) Patent No.: US 7,440,243 B2
(45) Date of Patent: Oct. 21, 2008

(54) READ SENSORS OF THE CPP TYPE HAVING NITROGENATED HARD BIAS LAYERS AND METHOD OF MAKING THE SAME

(75) Inventors: James Mac Freitag, Sunnyvale, CA (US); Mustafa Michael Pinarbasi, Morgan Hill, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 11/784,733

(22) Filed: Apr. 9, 2007

(65) Prior Publication Data

US 2007/0253123 A1 Nov. 1, 2007

Related U.S. Application Data

(63) Continuation-in-part of application No. 11/258,550, filed on Oct. 24, 2005.

(51) Int. Cl.
*G11B 5/127* (2006.01)
(52) U.S. Cl. .................................. 360/324.12
(58) Field of Classification Search ............... 360/324.1, 360/324.12
See application file for complete search history.

(56) References Cited

U.S. PATENT DOCUMENTS

| 7,177,121 B2 * | 2/2007 | Kojima et al. ........... 360/324.12 |
| 7,259,941 B2 * | 8/2007 | Pinarbasi ............... 360/324.12 |
| 2006/0002041 A1 * | 1/2006 | Pinarbasi ............... 360/324.12 |

* cited by examiner

*Primary Examiner*—Angel A Castro
(74) *Attorney, Agent, or Firm*—John J. Oskorep, Esq.; Rambod Radar (57) ABSTRACT

A read sensor of the current-perpendicular-to-the-planes (CPP) type includes a sensor stack structure formed in a central region between first and second shield layers which serve as leads for the read sensor; insulator layers formed in side regions adjacent the central region; seed layer structures formed over the insulator layers in the side regions; and hard bias layers formed over the seed layer structures in the side regions. The hard bias layers are made of a nitrogenated cobalt-based alloy, such as nitrogenated cobalt-platinum (CoPt). Suitable if not exemplary coercivity and squareness properties are exhibited using the nitrogenated cobalt-based alloy. The hard bias layers may be formed by performing an ion beam deposition of cobalt-based materials using a sputtering gas (e.g. xenon) and nitrogen as a reactive gas.

12 Claims, 5 Drawing Sheets

READ SENSORS OF THE CPP TYPE HAVING NITROGENATED HARD BIAS LAYERS AND METHOD OF MAKING THE SAME

CROSS-REFERENCE TO RELATED APPLICATION

This application is a continuation-in-part of U.S. patent application Ser. No. 11/258,550 filed on 24 Oct. 2005 and entitled "Improved Read Sensors Having Nitrogenated Hard Bias Layers And Method Of Making The Same."

BACKGROUND

1. Field of the Technology

This present disclosure relates generally to magnetic read heads having read sensors for reading information signals from a magnetic medium, and more particularly to read sensors of the current-perpendicular-to-the-planes (CPP) type having hard bias layers made of nitrogenated cobalt-based alloys for improved hard magnet properties and methods of making the same.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer. A common type of MR sensor is the giant magnetoresistance (GMR) sensor which manifests the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron (NiFe), cobalt (Co), or nickel-iron-cobalt (NiFeCo)) separated by a layer of nonmagnetic material (e.g., copper (Cu)) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (e.g., nickel-oxide (NiO), iridium-manganese (IrMn) or platinum-manganese (PtMn)) layer.

The magnetization of the other ferromagnetic layer, referred to as the free layer, however, is not fixed and is free to rotate in response to the field from the information recorded on the magnetic medium (the signal field). In the SV sensors, SV resistance varies as the cosine of the angle between the magnetization of the pinned layer and the magnetization of the free layer. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. In addition to the magnetoresistive material, the GMR sensor has conductive lead structures for connecting the GMR sensor to a sensing means and a sense current source. Typically, a constant current is sent through the GMR sensor through these leads and the voltage variations caused by the changing resistance are measured via these leads.

Figure 1:
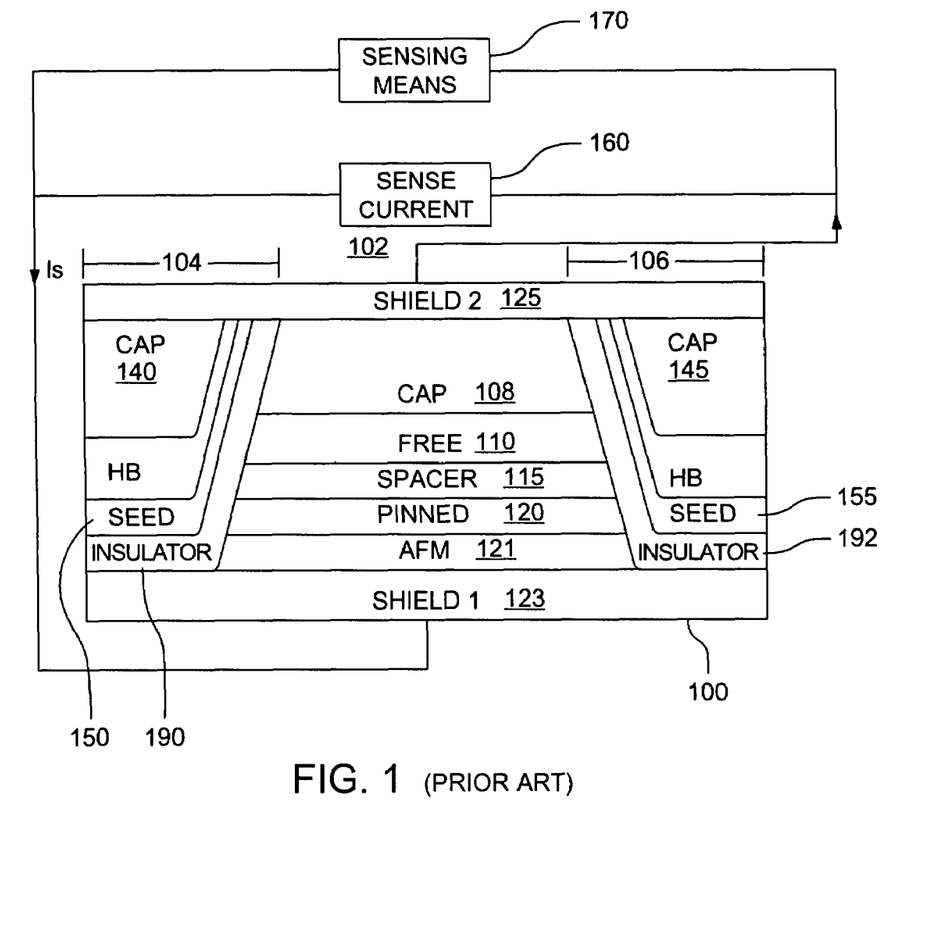
FIG. 1 is a schematic diagram of an air-bearing surface (ABS) view of the thin film structure of a prior art read sensor device (e.g. a spin valve or SV sensor) of the current-perpendicular-to-the-planes (CPP) type.

To illustrate, FIG. 1 shows a prior art SV sensor 100 of the current-perpendicular-to-the-planes (CPP) type having side regions 104 and 106 which are separated by a central region 102. A free layer 110 is separated from a pinned layer 120 by a non-magnetic, electrically-conducting or insulating spacer 115. Spacer 115 may be made of electrically-conductive materials if sensor 100 is a GMR sensor, or alternatively, electrically-insulative materials if sensor 100 is a tunnel magnetoresistive (TMR) sensor. The magnetization of pinned layer 120 is fixed by an AFM pinning layer 121, which is formed on a shield layer 132 which may reside on a substrate 180 (not shown in FIG. 1). Cap layer 108, free layer 110, spacer layer 115, pinned layer 120, and AFM pinning layer 121 are all formed in central region 102. Read sensor layers of read sensor 100 are generally sandwiched between shield layers 123 and 125, which together serve as a shield and as leads for the sensor.

Conventionally, hard bias layers 130 and 135 are formed in side regions 104 and 106 in order to stabilize free layer 10. These hard bias layers 130 and 135 are typically formed of a cobalt-based alloy which is sufficiently magnetized and perhaps shielded so that the magnetic fields of the media and/or the write head do not effect the magnetism of the hard magnets. Seed layers 150 and 155 are also deposited in side regions 104 and 106 underneath hard bias layers 130 and 135 to set a texture for the successful deposition of the hard magnets by promoting a desired c-axis in plane orientation. To perform effectively, hard bias layers 130 and 135 should have a high coercivity, a high MrT (magnetic remanencex thickness), and a high in-plane squareness on the magnetization curve. A preferred cobalt-based alloy for hard bias layers 130 and 135 is cobalt-platinum (CoPt) or cobalt-platinum-chromium (CoPtCr), while seed layers 150 and 155 typically comprise chromium (Cr) or other suitable metallic element.

Thus, as illustrated in FIG. 1, seed layers 150 and 155 and hard bias layers 130 and 135 are formed in side regions 104 and 106, respectively, and provide longitudinal bias for free layer 110. Cap layers 140 and 145 are formed over these hard bias layers 130 and 135, respectively, in the side regions 104 and 106. Seed layers 150 and 155 are formed over insulator layers 190 and 192, respectively, which are in turn formed directly over shield layer 123. Shield layers 123 and 125, which are "leads" of the sensor 100, provide electrical connections for the flow of the sensing current $I_s$ from a current source 160 to the sensor 100. In read sensors of the CPP type, sensing current $I_S$ is generally forced through the layers in central region 102 but not through side regions 104 and 106. Sensing means 170, which is connected to these leads, senses the change in the resistance due to changes induced in the free layer 110 by the external magnetic field (e.g. field generated by a data bit stored on a disk). One material for constructing these leads/shield layers 140 and 145 is a highly conductive material, such as a metal.

Figure 2:
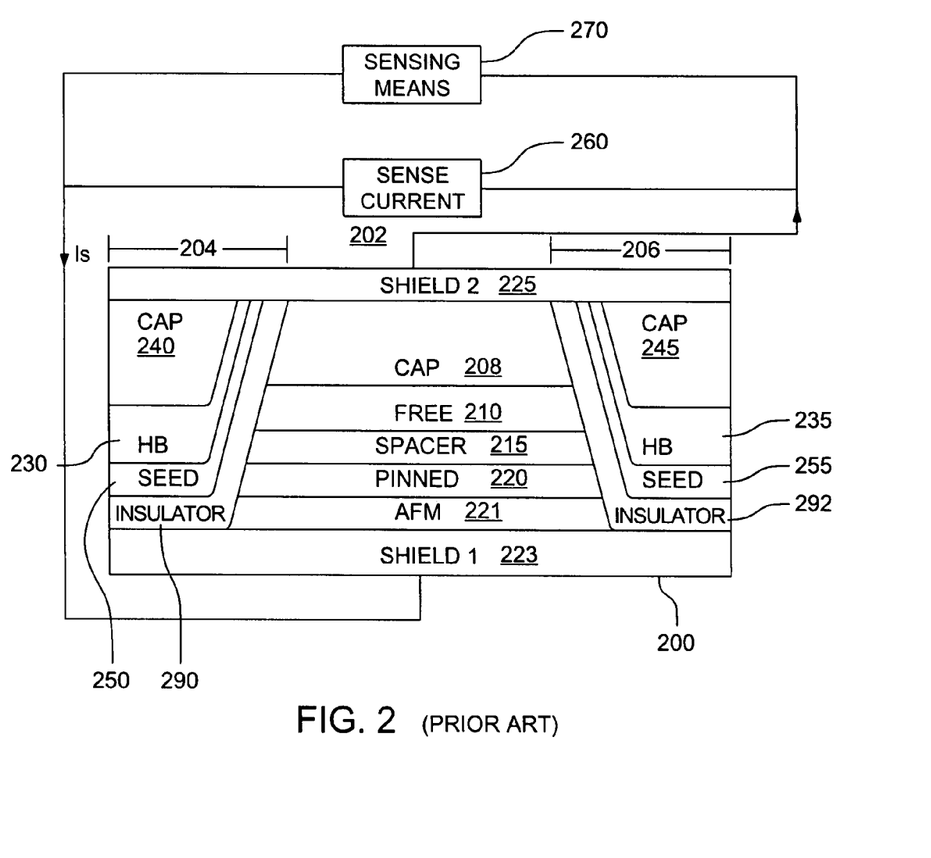
FIG. 2 is a schematic diagram of an air-bearing surface (ABS) view of the thin film structure of a "partial mill" prior art read sensor device of the CPP type.

FIG. 2 shows a prior art read sensor 200 of the CPP type, similar to prior art read sensor 100 (FIG. 1), having side regions 204 and 206 separated by a central region 202. A free layer 210 is separated from a pinned layer 220 by a non-magnetic, electrically-conducting or insulating spacer 215.

The magnetization of pinned layer 220 is fixed by an AFM pinning layer 221, which is formed on a shield layer 223 which may reside on a substrate (not shown in FIG. 2). Cap layer 208, free layer 210, spacer layer 215 and pinned layer 220 are all formed in central region 202. Unlike prior art read sensor 100 of FIG. 1, prior art read sensor 200 of FIG. 2 is a partial mill design with materials of AFM pinning layer 221 of sensor 200 extending into side regions 204 and 206. By "partial mill design", it is meant that the read sensor layers are not fully etched or milled in side regions 204 and 206 prior to the deposition of the seed, hard bias, and lead materials. A partial mill design may be desirable in order to better align free layer 210 with hard bias layers 230 and 235.

As illustrated in FIG. 2, seed layers 250 and 255 and hard bias layers 230 and 235 are formed in side regions 204 and 206, respectively. Hard bias layers 230 and 235 provide longitudinal biasing for free layer 210. Cap layers 240 and 245 are formed over these hard bias layers 230 and 235, respectively, in side regions 204 and 206. Seed layers 250 and 255 are formed over insulator layers 290 and 292, respectively, which are in turn formed directly over AFM pinning layer 221.

Similarly, as described earlier in FIG. 1, shield layers 223 and 225 which serve as "leads" of the sensor 200 provide electrical connections for the flow of the sensing current $I_s$ from a current source 260 to the sensor 200. Sensing current $I_S$ is generally forced through the layers in central region 202 but not through side regions 204 and 206. Sensing means 270, which is connected to these leads, senses the change in the resistance due to changes induced in the free layer 210 by the external magnetic field (e.g. field generated by a data bit stored on a disk).

Again, to perform effectively, hard bias layers of a CPP read sensor should have a high coercivity, a high MrT, and a high in-plane squareness on the magnetization curve. What are needed are methods and apparatus for improving hard magnet properties in read sensors of the CPP type.

SUMMARY

A read sensor of the current-perpendicular-to-the-planes (CPP) type includes a sensor stack structure formed in a central region between first and second shield layers which serve as leads for the read sensor, insulator layers formed in side regions adjacent the central region, seed layer structures formed over the insulator layers in the side regions, and hard bias layers formed over the seed layer structures in the side regions. The hard bias layers are made of a nitrogenated cobalt-based alloy, such as nitrogenated cobalt-platinum (CoPt) or nitrogenated cobalt-platinum-chromium (CoPtCr). Suitable if not exemplary coercivity and squareness properties are exhibited using the nitrogenated cobalt-based alloy. The hard bias layers may be formed by performing an ion beam deposition of cobalt-based materials using a sputtering gas (e.g. xenon) and nitrogen as a reactive gas. The magnetic head having the read sensor may incorporated into a data storage apparatus, such as a hard disk drive.

BRIEF DESCRIPTION OF THE DRAWINGS

For a fuller understanding of the nature and advantages of the present disclosure, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

A read sensor of the current-perpendicular-to-the-planes (CPP) type includes a sensor stack structure formed in a central region between first and second shield layers which serve as leads for the read sensor, insulator layers formed in side regions adjacent the central region, seed layer structures formed over the insulator layers in the side regions, and hard bias layers formed over the seed layer structures in the side regions. The hard bias layers are made of a nitrogenated cobalt-based alloy, such as nitrogenated cobalt-platinum (CoPt). Advantageously, suitable if not exemplary coercivity and squareness properties are exhibited with use of the nitrogenated cobalt-based alloy. The hard bias layers may be formed by performing an ion beam deposition of cobalt-based materials using a sputtering gas (e.g. xenon) and nitrogen as a reactive gas. The magnetic head having the read sensor may incorporated into a data storage apparatus, such as a hard disk drive. The read sensor of the CPP type may be, for example, a giant magnetoresistive (GMR) read sensor or a tunnel magnetoresistive (TMR) read sensor.

Figure 3:
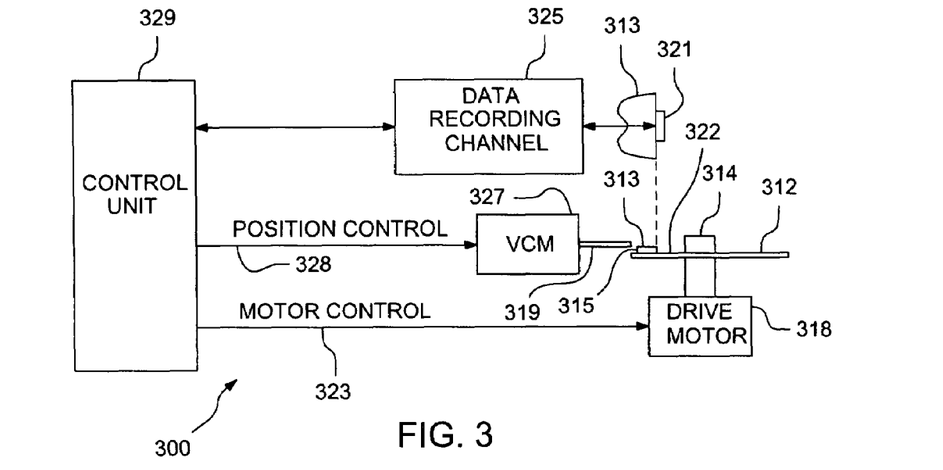
FIG. 3 is a block diagram of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312. At least one slider 313 is positioned on the disk 312, each slider 313 supporting a magnetic read/write head 321 which incorporates the SV sensor of the present disclosure. As the disks rotate, slider 313 is moved radially in and out over disk surface 322 so that head 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 (the surface of slider 313 which includes head 321 and faces the surface of disk 312 is referred to as an air bearing surface (ABS)) and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write head 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
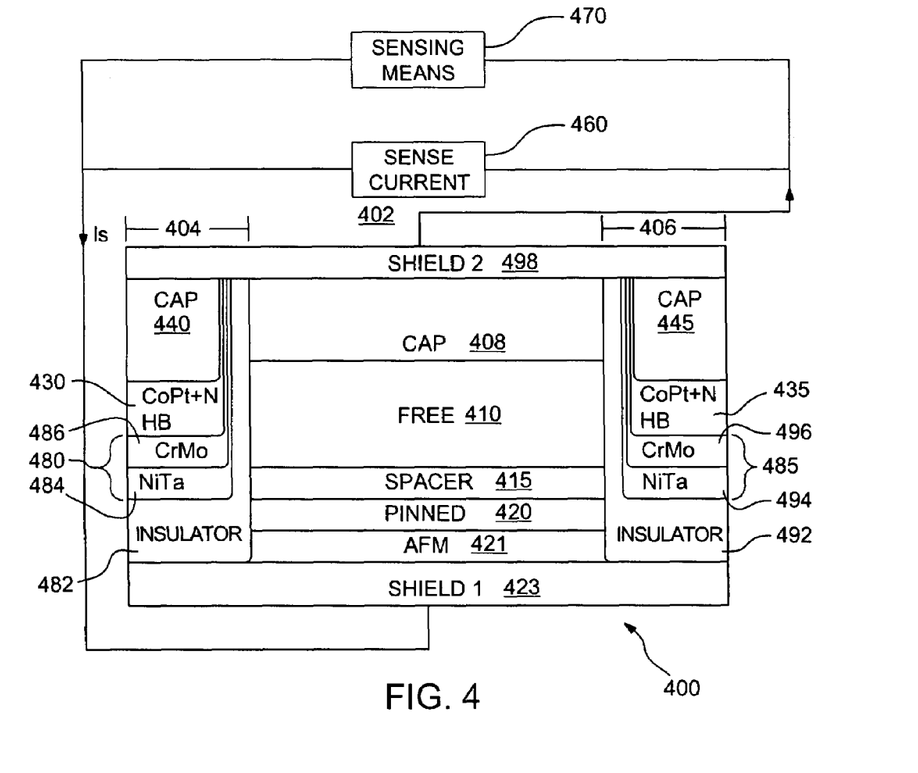
FIG. 4 is a schematic diagram of an ABS view of a thin film structure for a CPP-type read sensor (e.g. an SV read sensor) of the present disclosure having improved hard magnet properties.

FIG. 4 shows an air bearing surface (ABS) view of a spin valve (SV) sensor 400 of the CPP type of the present disclosure. SV sensor 400 may be structurally viewed as having a central region 402 and side regions 404 and 406 which are adjacent central region 402. A sensing layer (free ferromagnetic layer) 410 is separated from a pinned layer (pinned ferromagnetic layer) 420 by a non-magnetic, electrically-conducting or insulating spacer layer 415. Spacer 415 may be made of electrically-conductive materials if sensor 400 is a GMR sensor, or alternatively, electrically-insulative materials if sensor 400 is a tunnel magnetoresistive (TMR) sensor. The magnetization of pinned layer 420 is fixed by an antiferromagnetic (AFM) layer 421 which lies directly below it. A cap layer 408 is positioned over the structure, and specifically over free layer 410. Cap layer 408, sensing layer 410, spacer layer 415 and pinned layer 420 are all formed in central region 402 and form components of a sensor stack structure of SV sensor 400. Although SV sensor 400 is shown as having a "top-type" configuration, it may have a "bottom-type" or other type of configuration in the alternative.

Exemplary materials for SV sensor 400 of the present embodiment are provided as follows. Sensing layer 410 is formed of nickel-iron (NiFe) and cobalt-iron (CoFe), pinned layer 420 is formed of cobalt-iron (CoFe), and spacer layer 415 is formed of copper (Cu). Pinned layer 420 comprises a multi-layer film structure such as a first ferromagnetic layer/spacer/second ferromagnetic layer (e.g., cobalt-iron (CoFe)/ruthenium (Ru)/cobalt-iron (CoFe)). AFM pining layer 421 may be formed of platinum-manganese (PtMn), iridium-manganese (IrMn), and nickel-oxide (NiO).

Shield layers 423 and 498 serve as leads and provide electrical connections for the flow of the sensing current $I_s$ from a current source 460 to the read sensor 400. Sensing means 470, which is connected to these leads, senses the change in the resistance due to changes induced in the free layer 410 by the external magnetic field (e.g. field generated by a data bit stored on a disk).

Hard bias layers 430 and 435 are formed in the side regions 404 and 406, respectively, and are in alignment with and provide longitudinal bias for free layer 410. Cap layers 440 and 445 are formed over these hard bias layers 430 and 435, respectively. Multi-layered seed layer structures 480 and 485, which in this embodiment are "bi-layered" seed layer structures, are also formed in side regions 404 and 406, respectively. More particularly, multi-layered structures 480 and 485 are formed below hard bias layers 430 and 435, respectively, adjacent the sensor stack structure and over insulator layers 482 and 492, respectively, in side regions 404 and 406. Insulator layers 482 and 492 are formed over and directly on first shield layer 423. Insulator layers 482 and 492 are made of electrically insulative materials and, preferably, made of alumina or atomic layer deposited (ALD) alumina.

Multi-layered structure 480 in side region 404 has a first layer 484 corresponding to a bottom layer of multi-layered structure 480 and a second layer 486 corresponding to a top layer of multi-layered structure 480. First layer 484 may be made of nickel-tantalum (NiTa) or nitrogenated nickel-tantalum (NiTa+N), and second layer 486 may be made of CrMo. Multi-layered structure 485 in side region 406 has the same material structure in first and second layers 494 and 496 as does multi-layered structure 480. Preferably, each first layer 484 has a thickness of between 3-100 Angstroms and each second layer 486 has a thickness of between 20-200 Angstroms. The hard bias materials exhibit an increased coercivity and squareness with use of such a multi-layered structure.

Preferably, the hard bias materials utilized in hard bias layers 430 and 435 are a cobalt-based material or alloy such as cobalt-platinum (CoPt) or cobalt-platinum-chromium (CoPtCr). The cobalt-based materials have a relatively small grain size, for example, on the order of 100 Angstroms. In accordance with the present disclosure, the cobalt-based alloy is nitrogenated so as to form hard bias layers 430 and 435 as a nitrogenated cobalt-based alloy. Thus, a preferred material for use as hard bias layers 430 and 435 is nitrogenated cobalt-platinum (CoPt+N). As will be described in more detail below in relation to the method of FIGS. 5-8, hard bias layers 430 and 435 are formed by sputter-depositing a cobalt-based alloy using a sputtering gas as well as nitrogen as a reactive gas. The use of nitrogen in the deposition process causes the grain size of the CoPtCr to be reduced (e.g. to about 85 Angstroms).

Suitable if not exemplary coercivity and squareness properties are exhibited using the nitrogenated cobalt-based alloy. In the present embodiment, the squareness of hard bias layers 430 and 435 is between about 0.78-0.82 (e.g. about 0.81) with use of the nitrogenated cobalt-based alloy. Coercivity of the read sensor is maintained at sufficient and acceptable levels, between about 1500-2500 Oersteds.

Thus, the magnetic head has a sensor stack structure of a read sensor formed in central region 402 between shield layers 423 and 498, insulator layers 482 and 492 formed in side regions 404 and 406 adjacent central region 402 (e.g. formed over or directly on shield layer 423), seed layer structures 480 and 485 formed over insulator layers 482 and 492 in side regions 404 and 406, and hard bias layers 430 and 435 formed over seed layer structures 480 and 485, where hard bias layers 430 and 435 are made of a nitrogenated cobalt-based alloy. More particular, hard bias layers 430 and 435 are preferable made of nitrogenated cobalt-platinum (CoPt) or cobalt-platinum-chromium (CoPtCr). Hard bias layers 430 and 435 are formed in side regions 404 and 406 adjacent and in (planar) alignment with free layer 410 in central region 402.

Figure 5:
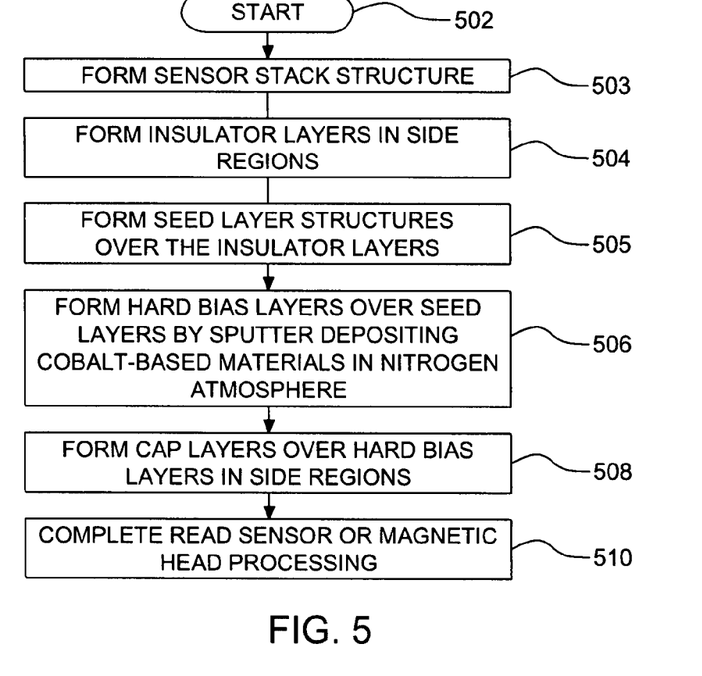
FIG. 5 is a flowchart describing a method of making a CPP read sensor of the present disclosure having improved hard magnet properties.

FIG. 5 is a flowchart describing a method of making a read sensor of the present disclosure having improved hard magnet properties. FIG. 5 will be described in combination with FIGS. 6-8, which are cross-sectional views of partially-fabricated read sensor structures made in accordance with the method of FIG. 5.

Figure 6:
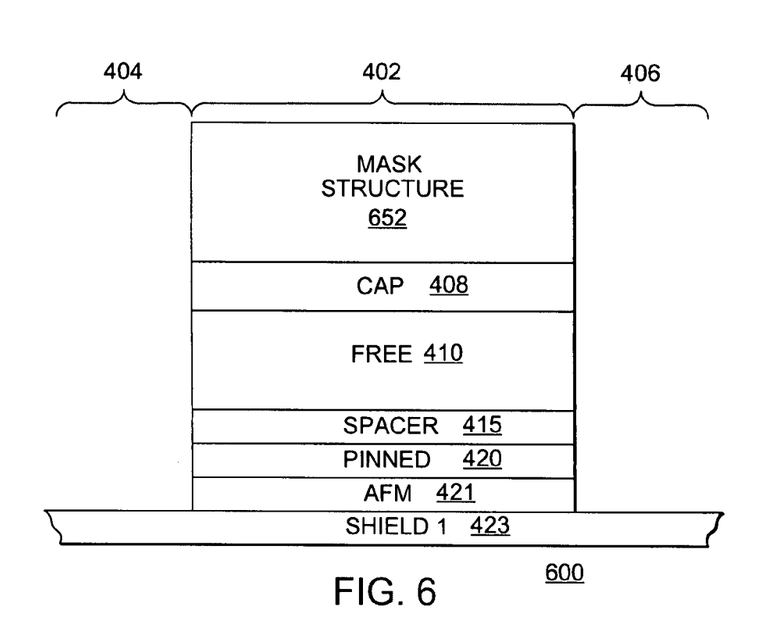
FIGS. 6-8 are cross-sectional views of partially-fabricated read sensor structures of the CPP type for use in describing the method of the flowchart of FIG. 5.

Beginning at a start block 502 of FIG. 5, a sensor stack structure 600 is formed in central region 402 as shown in FIG. 6 (step 503 of FIG. 5). To reach this stage of processing, SV sensor structure 600 is generally formed using full-film deposition, lithography, and etching techniques. In particular, a mask structure 652 is applied and patterned in central region 402 over a plurality of read sensor layers which are deposited in full film over shield layer 423. Mask structure 652 is formed with a suitable width so as to define an appropriate trackwidth (TW) for the SV sensor to be fabricated.

Mask structure 652 may be or include, for example, a resist such as a photoresist. However, non-resist materials in mask structure 652 may be utilized. Mask structure 652 is preferably formed so as to not have any undercuts, but rather straight sidewalls from top to bottom; that is, the mask structure sidewalls are substantially normal to a plane defined by the previously deposited read sensor layers. Although mask structure 652 may be a monolayer mask structure (e.g. a monolayer resist or photoresist), it may alternatively be a multi-layered mask structure (e.g. bilayer or trilayer structure) which is formed without undercuts. Alternatively, mask structure 652 may be structured so as to have undercuts (e.g. a bilayer resist having undercuts).

An etching (e.g. an ion beam milling process) is then performed with mask structure 652 kept in place. During the ion beam milling process, mask structure 652 masks what will become an active region of the SV sensor. The layers formed under mask structure 652 are protected during the ion milling process and remain intact. However, the portions of pinned layer 420, spacer layer 415, sensing layer 410, and capping layer 408 that are not protected by the mask during the ion milling process are removed in side regions 404 and 406 by the ion mill. The ion milling process may be stopped at shield layer 423, but alternatively may be stopped at any suitable one of the sensor layers (e.g. in a "partial-mill" design).

Figure 7:
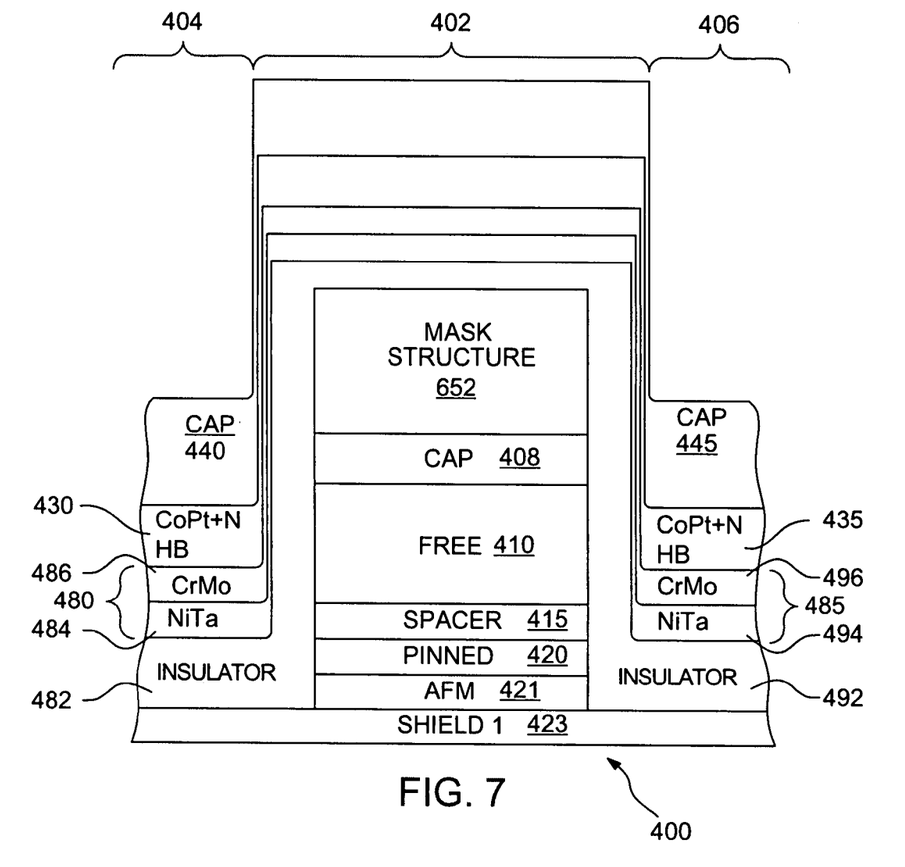

In FIG. 7, insulator materials (e.g. alumina or ALD alumina) are deposited over the structure so as to form insulator layers 482 and 492 in side regions 404 and 406, respectively, and over the top of mask structure 652 (step 504 of FIG. 5). Next, seed layer structures 480 and 485 are deposited over insulator layers 482 and 492, respectively, and over the top of mask structure 652 (step 505 of FIG. 5). In this embodiment, seed layer structures 480 and 485 are bi-layer seed layer structures having a first (bottom) layer 484 of nickel-tantalum (NiTa) (or nitrogenated NiTa) and a second (top) layer (486) made of chromium-molybdenum (CrMo). To form first layer 484, NiTa may be deposited in a nitrogen ($N_2$) atmosphere over first layer 482. Preferably, first layer 484 of the NiTa is deposited to a thickness between about 3 to 100 Å, and preferably has a specific thickness of about 15 Å. In one embodiment, the NiTa is deposited in the nitrogen atmosphere with a nitrogen partial pressure of about $2.5 \times 10^{-5}$ Torr. The NiTa may be then exposed to oxygen for a time period of about 30 seconds, for example. The partial pressure of the oxygen may be between about $5 \times 10^{-6}$ Torr and $5 \times 10^{-5}$ Torr, or preferably to about $2.5 \times 10^{-5}$ Torr. Second layer 486 made of CrMo is then deposited over second layer 484 made of the nickel-tantalum. Preferably, second layer 486 is deposited to a thickness between 20 to 200 Å, and preferably has a specific thickness of about 50 Å.

Subsequently, hard bias materials are deposited over the structure so as to form hard bias layers 430 and 435 in side regions 404 and 406, respectively, and over the top of mask structure 652 (step 506 of FIG. 5). Hard bias layers 430 and 435 are located in side regions 404 and 406 so as to be in alignment with free layer 410 in central region 402. In general, hard bias layers 430 and 435 are provided for longitudinally biasing free layer 410 in central region 402.

As described above in relation to FIG. 4, hard bias layers 430 and 435 are made of or include a nitrogenated cobalt-based alloy (e.g. CoPt+N, or CoPtCr+N). To form hard bias layers 430 and 435, an ion beam sputtering system may be used. In this case, cobalt-based materials are deposited by ion beam deposition with use of a sputtering gas in nitrogen ($N_2$) atmosphere. The sputtering gas may be, for example, an xenon (Xe) gas. The nitrogen is not used as part of the sputtering ions, but is rather supplied as a reactive gas in a deposition chamber of the system during the deposition. The cobalt-based materials have a reduced and relatively small grain size (e.g. on the order of approximately 85 Angstroms) due at least in part to use of the nitrogen in the deposition process. Furthermore, suitable if not exemplary coercivity and squareness properties are exhibited using the nitrogenated cobalt-based alloy. In the present embodiment, the squareness of hard bias layers 430 and 435 is between about 0.78-0.82 (e.g. about 0.81) with use of the nitrogenated cobalt-based alloy. Coercivity of the read sensor is maintained at sufficient and acceptable levels, between about 1500-2500 Oersteds (at least greater than 1000 Oersteds).

Next in FIG. 7, cap layers 440 and 445 are deposited over the structure in side regions 404 and 406, respectively, as well as over mask structure 652 (step 508 of FIG. 5). A chemical-mechanical polishing (CMP) is then performed over the structure to remove mask structure 652 and to form a top planar surface for the read sensor. In general, the mechanical interaction of a CMP pad during the CMP process removes the mask structure 652 from the remaining layers underneath it. The CMP pad makes physical contact with the mask structure materials (i.e. mask structure having the hard bias and lead layers formed thereover) and compresses them until the CMP pad reaches a top surface of the sensor structure. Alternatively, if mask structure 652 is formed with undercuts (e.g. a bilayer mask with undercuts), the mask structure may be removed by utilizing a suitable conventional solvent. Shield layer 498 is then formed over the structure. The resulting structure is shown in FIG. 8.

Figure 8:
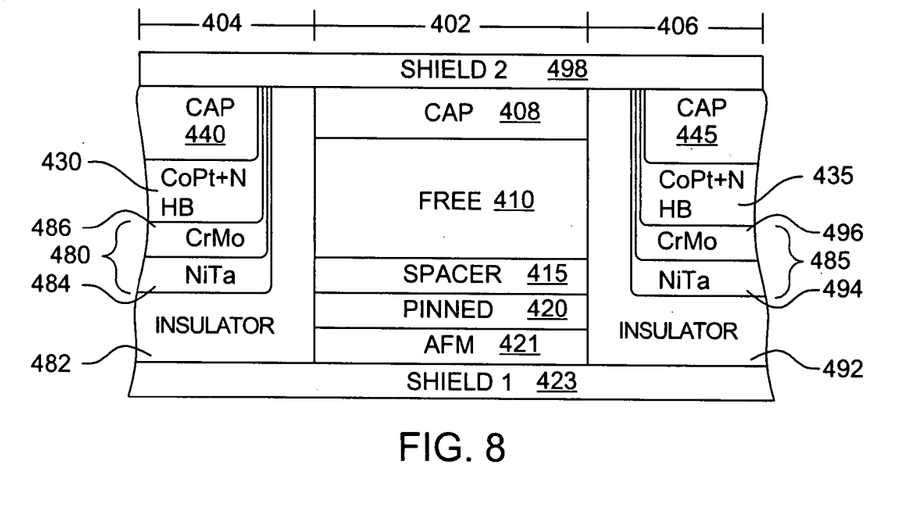

The resulting SV sensor 400 of FIG. 8 has an active SV structure formed in central region 402 in between shield layers 423 and 498, and cap layers 440 and 445 and hard bias layers 450 and 455 formed in side regions 404 and 406, respectively. Hard bias layers 450 and 455 are formed over seed layer structures 480 and 485, respectively, which are formed over insulator layers 482 and 492, respectively. Insulator layers 482 and 492 may be formed directly on shield layer 423 or other suitable material of the sensor. Hard bias layers 450 and 455 are suitably positioned so as to longitudinally bias free layer 410. Shield layers 423 and 498 provide electrical connections for the flow of a sensing current $I_s$ from a current source to the sensor. A sensing means connected to shield layers 423 and 498 sense the change in the resistance due to changes induced in free layer 410 by an external magnetic field (e.g. field generated by a data bit stored on a disk). Additional conventional processing steps may be performed to complete the fabrication of read sensor 600 and the magnetic head (step 510 of FIG. 5).

Final Comments. A read sensor of the current-perpendicular-to-the-planes (CPP) type includes a sensor stack structure formed in a central region between first and second shield layers which serve as leads for the read sensor, insulator layers formed in side regions adjacent the central region, seed layer structures formed over the insulator layers in the side regions, and hard bias layers formed over the seed layer structures in the side regions. The hard bias layers are made of a nitrogenated cobalt-based alloy, such as nitrogenated cobalt-platinum (CoPt). Suitable if not exemplary coercivity and squareness properties are exhibited using the nitrogenated cobalt-based alloy. The hard bias layers may be formed by performing an ion beam deposition of cobalt-based materials using a sputtering gas (e.g. xenon) and nitrogen as a reactive gas. The read sensor of the CPP type may be, for example, a GMR or TMR read sensor. The magnetic head having the read sensor may incorporated into a data storage apparatus, such as a hard disk drive.

It is to be understood that the above is merely a description of preferred embodiments of the invention and that various changes, alterations, and variations may be made without departing from the true spirit and scope of the invention as set for in the appended claims. The read sensor of the present disclosure may be any suitable type of read sensor, such as a current-in-plane (CIP) type GMR read sensor, a current-perpendicular-to-plane (CPP) type GMR read sensor, or a tunnel valve or magnetic tunnel junction (MTJ) type read sensor. Few if any of the terms or phrases in the specification and claims have been given any special particular meaning different from the plain language meaning to those skilled in the art, and therefore the specification is not to be used to define terms in an unduly narrow sense.

What is claimed is:

1. A read sensor, comprising:
   a sensor stack structure of a read sensor formed in a central region between first and second shield layers which serve as leads for the read sensor;
   insulator layers formed in side regions adjacent the central region;
   seed layer structures formed over the insulator layers in the side regions;
   hard bias layers formed over the seed layer structures in the side regions; and
   the hard bias layers comprising a nitrogenated cobalt-based alloy.

2. The read sensor of claim 1, wherein the nitrogenated cobalt- based alloy comprises nitrogenated cobalt-platinum (CoPt).

3. The read sensor of claim 1, wherein the nitrogenated cobalt- based alloy comprises nitrogenated cobalt-platinum-chromium (CoPtCr).

4. The read sensor of claim 1, further comprising:
   a free layer of the sensor stack structure; and
   the hard bias layers formed adjacent the free layer and longitudinally biasing the free layer.

5. The read sensor of claim 1, having an improved squareness due to the nitrogenation of the cobalt-based alloy.

6. The read sensor of claim 1, further comprising a magnetic head which incorporates the read sensor.

7. A data storage apparatus, comprising:
   at least one rotatable magnetic disk;
   a spindle supporting the at least one rotatable magnetic disk;
   a disk drive motor for rotating the at least one rotatable magnetic disk;
   a magnetic head for reading data from the at least one rotatable magnetic disk;
   a slider for supporting the magnetic head;
   the magnetic head including a read sensor having:
      a sensor stack structure of a read sensor formed in a central region between first and second shield layers which serve as leads for the read sensor;
      insulator layers formed in side regions adjacent the central region;
      seed layer structures formed over the insulator layers in the side regions;
      hard bias layers formed over the seed layer structures in the side regions; and
      the hard bias layers comprising a nitrogenated cobalt-based alloy.

8. The data storage apparatus of claim 7, wherein the nitrogenated cobalt-based alloy comprises nitrogenated cobalt-platinum (CoPt).

9. The data storage apparatus of claim 7, wherein the nitrogenated cobalt-based alloy comprises nitrogenated cobalt-platinum-chromium (CoPtCr).

10. The data storage apparatus of claim 7, further comprising:
    a free layer of the sensor stack structure; and
    the hard bias layer formed adjacent the free layer and longitudinally biasing the free layer.

11. The data storage apparatus of claim 7, wherein the read sensor exhibits a coercivity greater than 1000 Oersteds and the hard bias layers exhibit a squareness greater than 0.78.

12. The data storage apparatus of claim 7, having an improved squareness due to the nitrogenation of the cobalt-based alloy.

* * * * *

UNITED STATES PATENT AND TRADEMARK OFFICE
CERTIFICATE OF CORRECTION

PATENT NO. : 7,440,243 B2  
APPLICATION NO. : 11/784733  
DATED : October 21, 2008  
INVENTOR(S) : Freitag et al.

It is certified that error appears in the above-identified patent and that said Letters Patent is hereby corrected as shown below:

On the Title page item 73 Assignee, change "Hitachi Global Storage Technologies, Amsterdam (NL)" to --Hitachi Global Storage Technologies Netherlands B.V., Amsterdam (NL)--.

Signed and Sealed this

Sixteenth Day of December, 2008

JON W. DUDAS  
*Director of the United States Patent and Trademark Office*